United States Patent
Hosokawa (10) Patent No.: US 7,676,612 B2
(45) Date of Patent: Mar. 9, 2010

(54) VIDEO CAMERA DEVICE AND CONTROL METHOD THEREOF

(75) Inventor: Shuichi Hosokawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 345 days.

(21) Appl. No.: 11/142,162

(22) Filed: May 31, 2005

(65) Prior Publication Data

US 2005/0265099 A1     Dec. 1, 2005

(30) Foreign Application Priority Data

May 31, 2004    (JP)    ............... 2004-162463

(51) Int. Cl.
  G06F 13/12    (2006.01)
  G06F 3/00     (2006.01)
(52) U.S. Cl. .............. 710/62; 710/8; 710/10; 710/15; 710/16; 710/17; 710/18; 710/19; 725/32; 725/86
(58) Field of Classification Search ......... 710/62, 710/8, 10, 15, 16, 17, 18, 19; 725/32, 86
  See application file for complete search history.

(56) References Cited

U.S. PATENT DOCUMENTS

| | | | |
|---|---|---|---|
| 5,974,486 A | 10/1999 | Siddappa | 710/53 |
| 6,012,103 A | 1/2000 | Sartore et al. | |
| 6,108,028 A * | 8/2000 | Skarbo et al. | 348/14.03 |
| 6,151,653 A | 11/2000 | Lin et al. | 710/305 |
| 6,249,825 B1 | 6/2001 | Sartore et al. | |
| 6,493,770 B1 | 12/2002 | Sartore et al. | |
| 6,542,946 B1 * | 4/2003 | Wooten | 710/106 |
| 6,573,846 B1 | 6/2003 | Trivedi et al. | |
| 6,697,884 B1 * | 2/2004 | Katsch | 710/18 |
| 6,731,650 B1 | 5/2004 | Yamagishi | |
| 6,791,950 B2 * | 9/2004 | Wu | 370/257 |
| 6,801,576 B1 | 10/2004 | Haldeman et al. | |
| 6,816,929 B2 | 11/2004 | Ueda | 710/56 |

(Continued)

FOREIGN PATENT DOCUMENTS

CN    1180354 C    8/2002

(Continued)

OTHER PUBLICATIONS

Universal Serial Bus Specification Revision 2.0, Apr. 27, 2000.*

(Continued)

Primary Examiner—Henry W. H. Tsai
Assistant Examiner—Steven G Snyder
(74) Attorney, Agent, or Firm—Cowan, Liebowitz & Latman, P.C.

(57) ABSTRACT

A device determines whether a speed mode between the device and an external device is a first speed mode or a second speed mode, communicates with the external device at first speed if the speed mode is the first speed mode, and communicates with the external device at second speed slower than the first speed if the speed mode is the second speed mode. The device enables transfer of image data and displays the image data being transferred to the external device, if the speed mode is the first speed mode. The device disables the transfer of the image data and stops displaying the image data, if the speed mode is the second speed mode.

16 Claims, 11 Drawing Sheets

U.S. PATENT DOCUMENTS

| | | | |
|---|---|---|---|
| 6,964,006 B2 * | 11/2005 | Aoki et al. | 714/784 |
| 7,006,260 B2 | 2/2006 | Sato et al. | |
| 7,545,434 B2 * | 6/2009 | Bean et al. | 348/362 |
| 2002/0054658 A1 * | 5/2002 | Morriss et al. | 375/377 |
| 2002/0162035 A1 | 10/2002 | Tsukihashi | |
| 2002/0178310 A1 | 11/2002 | Nozaki | |
| 2002/0184429 A1 * | 12/2002 | Chang et al. | 710/313 |
| 2003/0007001 A1 * | 1/2003 | Zimmerman | 345/716 |
| 2003/0018839 A1 * | 1/2003 | Ishida | 710/71 |
| 2003/0056051 A1 * | 3/2003 | Burke et al. | 710/302 |
| 2003/0108340 A1 | 6/2003 | Yamashita et al. | 386/96 |
| 2003/0131267 A1 * | 7/2003 | Berthoud | 713/300 |
| 2004/0061783 A1 * | 4/2004 | Choi et al. | 348/207.1 |
| 2004/0090253 A1 * | 5/2004 | McNitt et al. | 327/170 |
| 2004/0109062 A1 | 6/2004 | Yamaya | |
| 2005/0066087 A1 | 3/2005 | Wu | 710/63 |
| 2005/0149640 A1 | 7/2005 | Hosokawa | 710/8 |

FOREIGN PATENT DOCUMENTS

| | | | |
|---|---|---|---|
| CN | 1362676 A | | 8/2002 |
| CN | 1364265 | | 8/2002 |
| CN | 1222891 C | | 10/2005 |
| EP | 0 950 958 A1 | | 10/1999 |
| JP | 10-136245 | | 5/1998 |
| JP | 11-250009 A | | 9/1999 |
| JP | 2000-194645 A | | 7/2000 |
| JP | 2001-222503 A | | 8/2001 |
| JP | 2001-256183 A | | 9/2001 |
| JP | 2002-9849 A | | 1/2002 |
| JP | 2002-510416 A | | 4/2002 |
| JP | 2002-244949 A | | 8/2002 |
| JP | 2002-312081 A | | 10/2002 |
| JP | 2002-318778 | | 10/2002 |
| JP | 2002-342260 A | | 11/2002 |
| JP | 2003-050767 A | | 2/2003 |
| JP | 2003-131865 A | | 5/2003 |
| JP | 2003-150539 | | 5/2003 |
| JP | 2003-150539 A | | 5/2003 |
| JP | 2003-281088 A | | 10/2003 |
| JP | 2002223213 A1 | | 6/2007 |
| KR | 2001-0022816 A | | 3/2001 |
| KR | 2002-0090222 A | | 11/2002 |
| KR | 1020030072980 A | | 9/2003 |
| KR | 1020040043592 A | | 5/2004 |
| WO | 99/01820 A1 | | 1/1999 |
| WO | 9908196 A1 | | 2/1999 |
| WO | 0259895 A1 | | 1/2002 |

OTHER PUBLICATIONS iBot2 USB 2.0 WebCam—from Orange Micro. http://www.usb-ware.com/ibot2-webcam.htm.*

Universal Serial Bus Device Class Definition for Video Devices, Revision 1.0, Sep. 4, 2003.

Universal Serial Bus Specification, Compaq Intel Microsoft NEC, Revision 1.1, Sep. 23, 1998.

Universal Serial Bus Specification; Compaq, Hewlett-Packard, Intel, Lucent, Microsoft, NEC, Philips; Revision 2.0, Apr. 27, 2000; pp. 1-622.

Universal Serial Bus Device Class Definition for Video Devices; Revision 1.0RC4; Jun. 26, 2003; pp. 1-119.

"Universal Serial Bus Device Class Definition for Video Devices", Copyright 2001, 2002, 2003 USB Implementers Forum, pp. 1-130, Revision 1.0, Sep. 4, 2003.

Korean Office Action, dated Sep. 7, 2007.

Universal Serial Bus Device Class Definition for Audio Devices, Mar. 18, 1998, Release 1.0, pp. 1-130.

USB in a NutShell, Chapter 2—Hardware, Dec. 27, 2001, pp. 1-5.

Japanese Office Action issued on Jan. 13, 2009 for the basic Japanese Patent Application No. 2004-162463 (No English translation provided).

Masahiko Kuwano, "Realization of USB High-Speed Transmission for Connecting PC Peripheral Devices at Higher Speed", "Complete Overview of High-Speed Bus Systems", Interface, vol. 29, No. 7, CQ Publishing Co., Ltd. pp. 101-105.

CyberTech Media Group,"Strearning Video Production," http://web.archive.org/web/20030811172041//www.web-ads.com/cbrtech/compare.html (1 of 5) Jul. 15, 2009.

The above US reference; Foreign References, and Non-Patent Reference #1 were cited in a Jun. 5, 2009 Japanese Office Action that issued in Japanese Patent Application No. 2003-303543, which is enclosed without English Translation. The above US reference #2 and Non-Patent Reference #2 was cited in a Aug. 12, 2009 US Office Action that issued in related U.S. Appl. No. 10/928,859, which is enclosed.

H. Tanabe, *Interface (featuring "Technical Guide of Spreading Home Networks—new techniques focusing connectivity and usefulness have been developed one after another")*; *Section 5: Changes and Enhancements in USB 2.0 - significantly enhanced and expected for new possibilities,* Sep. 2000, pp. 106-210, CQ Publishing, Japan (*Note:* This article merely outlines techniques described in Universal Serial Bus Specification Revision 2.0, Apr. 27, 2000, which has been filed with IDS).

* cited by examiner

PIPE CONSTRUCTION AT THE TIME OF USB CONNECTION

| Endpoint# | 0 | 1 | 2 | 3 |
|---|---|---|---|---|
| TYPE | Control | Interrupt | Isochronous | Bulk |
| DIRECTION | — | In | In | In |
| Class | Default | Video | | |
| Sub Class | — | Video Control | Video Stream | Still Image |
| Format | — | — | DV | JPEG |

PIPE CONSTRUCTION AT THE TIME OF USB CONNECTION

| Endpoint# | 0 | 1 | 2 | 3 |
|---|---|---|---|---|
| TYPE | Control | Interrupt | Bulk | Bulk |
| DIRECTION | — | In | In | In |
| Class | Default | Video | | |
| Sub Class | — | Video Control | Video Stream | Still Image |
| Format | — | — | DV | JPEG |

VIDEO CAMERA DEVICE AND CONTROL METHOD THEREOF

FIELD OF THE INVENTION

The present invention relates to an electric device capable of being connected to a serial bus, e.g., Universal Serial Bus (USB), and a control method of the electric device.

BACKGROUND OF THE INVENTION

Among cameras capable of being connected to a USB, some cameras can control timing of image data reading from a recording medium (memory card) or timing of image data writing on a USB bus in accordance with a transfer mode (isochronous transfer/bulk transfer) at the time of USB connection (Japanese Patent Application Laid-Open No. 10-136245). In a case of a first transfer mode that assures a certain transfer rate (isochronous transfer mode), such camera parallelly performs image data reading of one frame from a CCD or a recording medium to store in a memory (RAM) and image data reading of one frame from a memory (RAM) to output on a USB bus. In a case of a second transfer mode that does not assure a certain transfer rate (bulk transfer mode), image data writing of one frame is performed after image data reading of one frame is completed. By virtue of this configuration, image data can be transferred for sure in any of the first and second transfer modes. Furthermore, the camera has a function for informing a connected host of a desired transfer method (isochronous transfer/bulk transfer). By virtue of this function, data transfer can be performed in the most appropriate transfer mode in accordance with the size of image data subjected to streaming playback.

Moreover, there is a control apparatus that performs control in accordance with a USB speed mode (High speed/Full speed) (Japanese Patent Application Laid-Open No. 2003-150539). This control apparatus comprises display means for displaying which of the first speed mode (High speed) or the second speed mode (Full speed) is set at the time of connection. Note that a detailed description regarding a USB is found in, e.g., "Universal Serial Bus Specification Revision 2.0, Apr. 27, 2000."

However in the conventional art, in a case where the foregoing camera transfers image data in an encoding format according to, e.g., Moving Picture Experts Group (MPEG) where decoding timing is defined on a playback side, decoding processing may not be performed in time on the playback side, and buffer underflow can occur. Furthermore, since image data transfer depends upon image data reading processing, in a case where data is transferred in a format where audio data and image data are multiplexed, the image data and the audio data may lose synchronism on the playback side and proper reproduction may not be realized.

Furthermore, in a case where the aforementioned control apparatus has a data transfer function that can secure a bandwidth only for high-speed connection, in other words, a function that cannot realize data transfer in full-speed connection due to lack of bandwidth, there is a problem in that a user is unable to know intuitively whether or not the function can be realized based on the speed mode at the time of USB connection.

SUMMARY OF THE INVENTION

The present invention has been proposed in view of the above-described problems, and the present invention is to solve the problems of the conventional art.

The present invention is, for example, to be able to detect a data transfer mode utilizing a serial bus, terminate a data transfer function which cannot be realized in the detected data transfer mode, and explicitly demonstrate to a user the termination of the data transfer function.

According to an aspect of the present invention, there is provided an electric device comprising:

a communication control unit configured to perform data transfer at first speed in a first speed mode, and to perform data transfer at second speed that is slower than the first speed in second speed mode, configure to perform data transfer; and a detection unit configured to detect whether a data transfer is implemented in the first speed mode or the second speed mode, wherein at least part of the data transfer by said communication unit is terminated, in a case where said detection unit detects the data transfer is performed in the second speed mode, and a fact that the at least part of the data transfer has been terminated is informed in a case where the at least part of the data transfer is terminated.

According to another aspect of the present invention, there is provided a control method of an electric device comprising:

a first data transfer step of performing data transfer in a first speed mode at first speed;

a second data transfer step of performing-data transfer in a second speed mode at second speed that is slower than the first speed;

a detection step of detecting whether a data transfer is performed in the first speed mode or the second speed mode;

a response step of transmitting no real data in response to a data transfer request, in a case where it is detected in the detection step that the data transfer is performed in the second speed mode; and an informing step of informing of a fact that a response has been made with no real data in the response step.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Hereinafter, preferred embodiments of the present invention will be described in detail with reference to the accompanying drawings. Note that the following embodiments do not limit the claimed invention. Furthermore, all combinations of features described in the embodiments are not essential to the solution presented by the present invention.

A digital video camera according to the first to fourth embodiments encodes inputted image data from an image sensor (CCD) and inputted audio data from a microphone to a digital video (DV) format, and transfers the digital data to a personal computer (PC) by a method conformed to the USB video class. The personal computer connected to the digital video camera according to the first to fourth embodiments of the present invention is an example of USB host having a function for receiving encoded data in a DV format by a transfer method conformed to the USB video class, decoding the data, and streaming playback the image and audio data. The digital video camera according to the first to fourth embodiments has a function as an image sensing device for storing sensed image data into a storage medium and the personal computer according to the first to fourth embodiments has a function as a control device for controlling the digital video camera.

Figure 1:
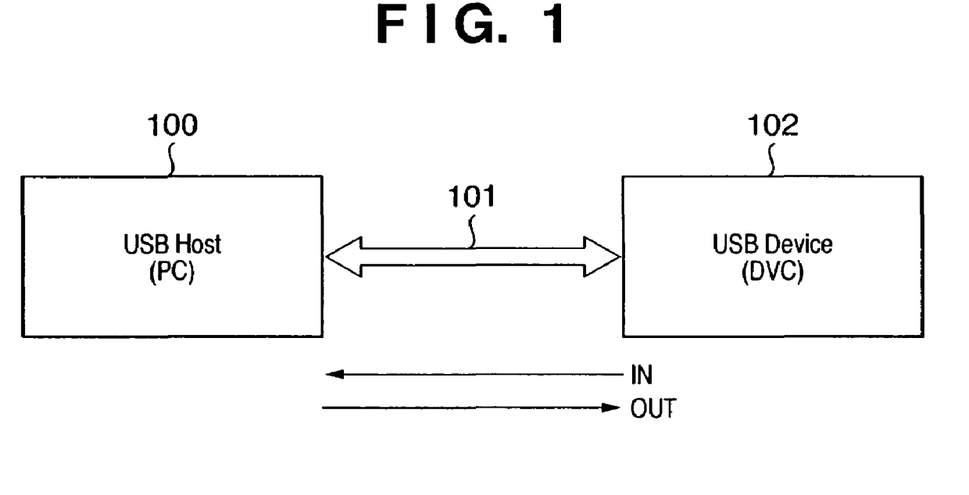
FIG. 1 is a block diagram showing a construction of a system in which a personal computer (PC) and a digital video camera are connected to each other, according to the first to fourth embodiments of the present invention.

FIG. 1 is a block diagram showing a construction of a system, having a personal computer and a digital video camera connected to each other, according to the first to fourth embodiments of the present invention.

In FIG. 1, numeral 100 denotes a personal computer (PC) serving as a USB host unit. Numeral 101 denotes a USB cable. Numeral 102 denotes a digital video camera (DVC) serving as a USB device, which comprises a USB port. In this system, the PC 100 is directly connected to the DVC 102 through the USB cable 101, and moving image and audio data during image sensing of the DVC 102 are transferred to the PC 100 as streaming playback data. Also, image files stored in a memory card of the DVC 102 can be transferred to the PC 100.

The data transfer direction from the DVC 102 to the PC 100 will be referred to as IN, and the data transfer direction from the PC 100 to the DVC 102 will be referred to as OUT.

By parallel execution of encoding by the DVC 102, data transfer through the USB cable 101, and decoding as well as playing back by the PC 100, the PC 100 can realize streaming playback of image signals transferred from the DVC 102. Assume that the DVC 102 enables the streaming playback function only at the time of high-speed connection, on account of a bit rate of the DV format and a bandwidth of the USB bus. During streaming playback, image data being streaming played back is displayed on a display 203 (FIG. 2) of the DVC 102. During non-streaming playback, a blue background is displayed. Furthermore, there is a function for displaying an error message on the display 203 to indicate that the streaming playback function is invalid in a case where a connection is established in a speed mode other than the high-speed mode. By virtue of this function, the DVC 102 can explicitly demonstrate to the user that the streaming playback function is invalid.

Figure 2:
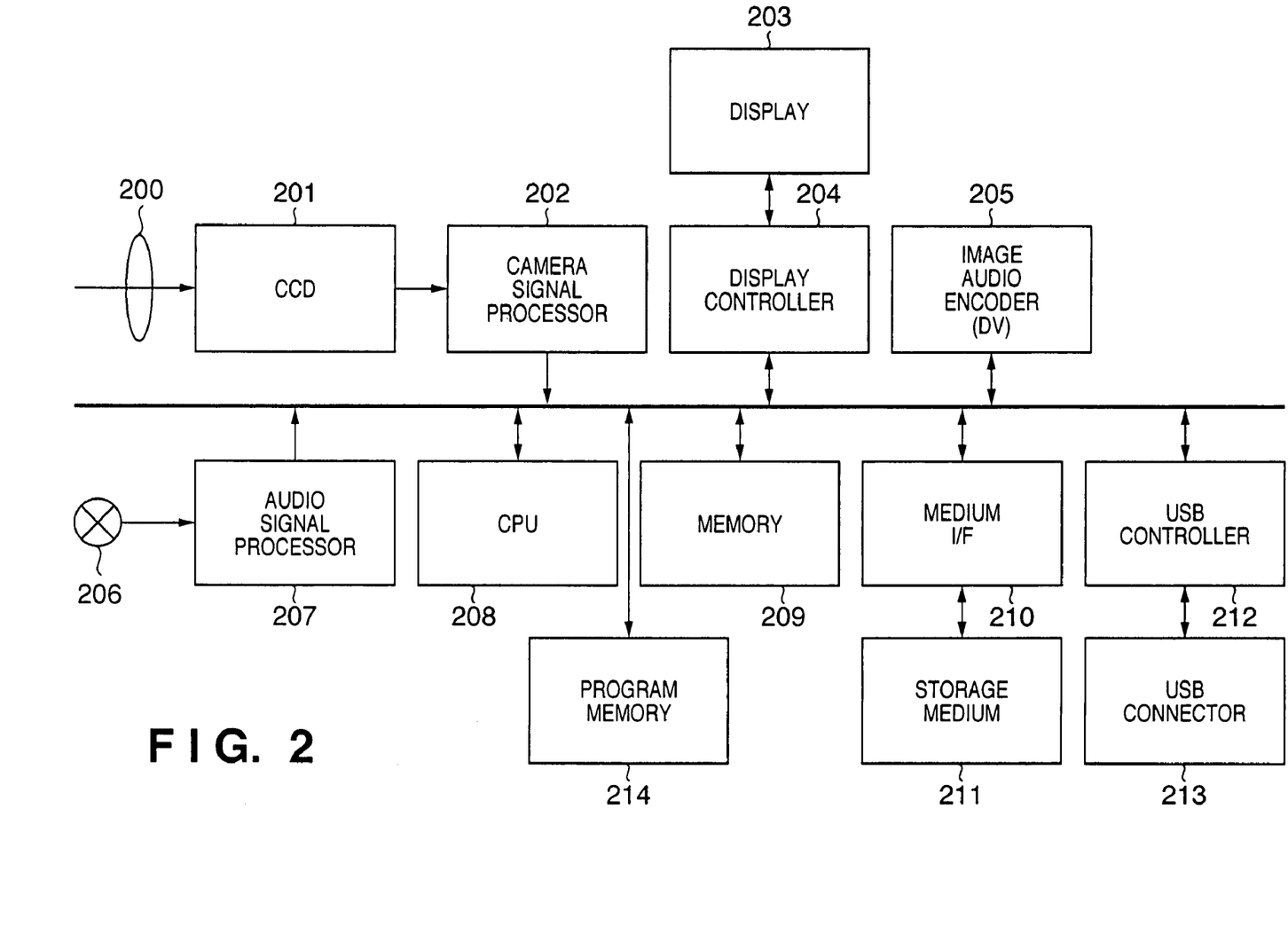
FIG. 2 is a block diagram showing a construction of the digital video camera according to the first to fourth embodiments of the present invention.

FIG. 2 is a block diagram showing a construction of the DVC 102 according to the first to fourth embodiments of the present invention.

In FIG. 2, a lens unit 200 inputs an optical image of an object. An image sensor 201 (CCD sensor, CMOS sensor or the like) converts the optical image of an object to an electric signal. A camera signal processor 202 performs signal processing to convert the electric signal from the image sensing device 201 to a standard image signal. A display 203, comprising a display unit such as a liquid crystal display, is used for displaying an image inputted from the CCD 201, an image stored in a storage medium 211, or a message addressed to a user. A display controller 204 controls image displaying on the display 203. An image audio encoder 205 encodes image and audio signals to digital video (DV) data, thereby performing compression on the image and audio signals. A microphone 206 is used for obtaining an audio signal. An audio signal processor 207 performs signal processing to convert the audio signal from the microphone 206 to a standard audio signal. A CPU 208 controls an operation of the entire DVC 102 in accordance with a control program developed and stored in a program area of a memory 209. The memory 209 is Also used as a memory for temporarily storing image data and audio data and the like. A storage medium interface 210 performs communication with a removable storage medium 211. The storage medium 211 is a memory card having a non-volatile memory, a cassette having a magnetic tape, a magnetic disk, an optical disk or the like. A USB controller 212 performs data communication conformed to, e.g., USB 2.0 (for details, refer to "Universal Serial Bus Specification Revision 2.0, Apr. 27, 2000"). The USB controller 212 also has a function for obtaining connection speed at the time of USB connection. A USB connector 213 is a connector for attaching or detaching a USB cable. Note that the USB controller 212 is not limited to the one conformed to the USB 2.0, but may be one conformed to a standard similar to the USB 2.0 or a standard expanded from the USB 2.0. A program memory 214 is configured with, e.g., a flash memory™, and stores a program which is executed by CPU 208. The program is decompressed, for instance, when the camera power is turned on, and stored in the memory 209.

The DVC 102, which is a USB device, has a function for streaming an image signal in a DV format from the CCD 201 to the PC 100. The USB class employed in the DVC 102 is shown in FIG. 3.

Figure 3:
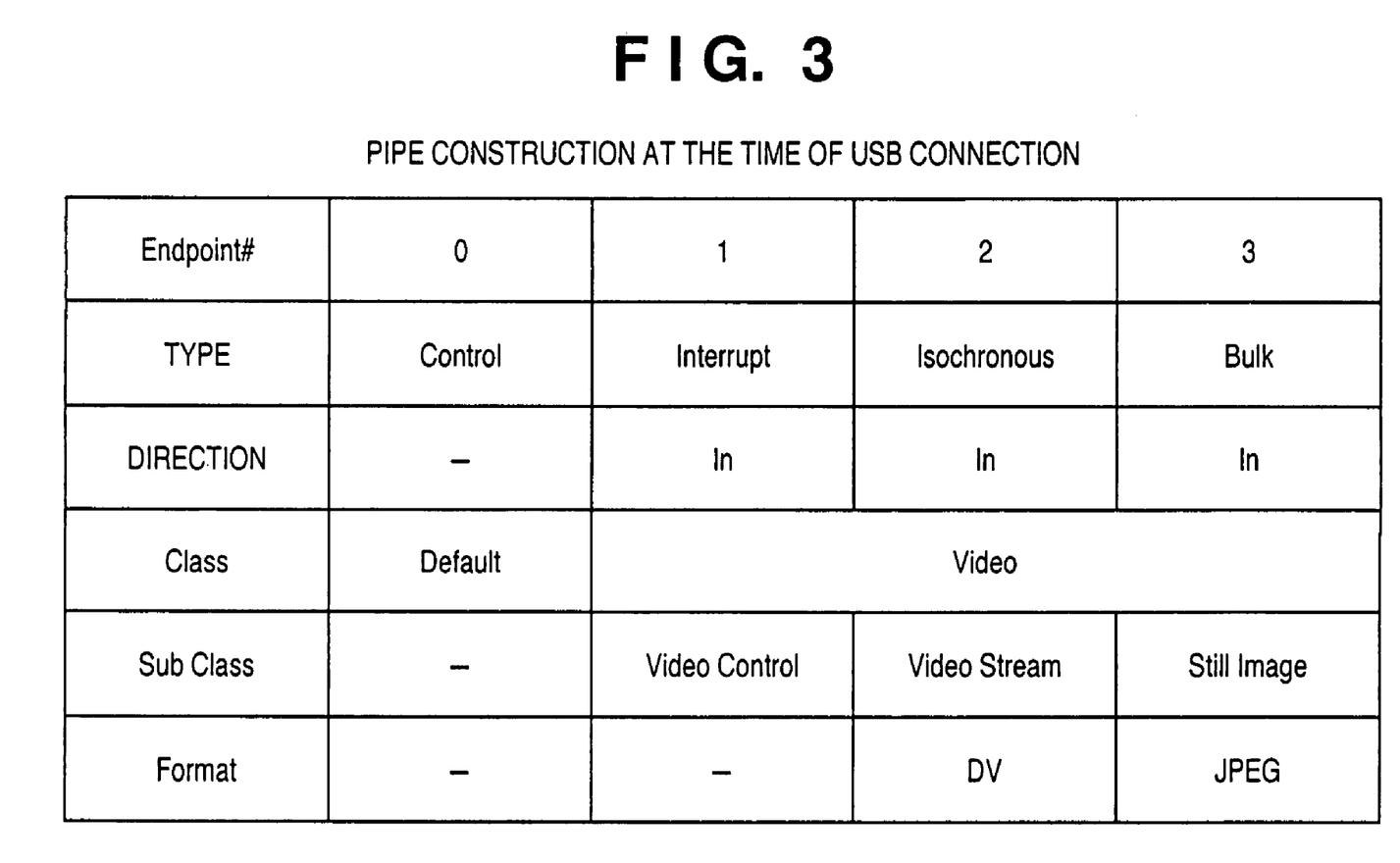
FIG. 3 depicts an explanatory view showing a class employed in the digital video camera according to the first to third embodiments of the present invention.

FIG. 3 depicts an explanatory view showing a class employed in the DVC 102 according to the first to third embodiments of the present invention.

The USB controller 212 has a function for changing four end points 0 to 3 for communication (communication pipes), and the transfer direction as well as the type of data transfer (bulk transfer (Bulk)/interrupt transfer (Interrupt)/isochronous transfer (Isochronous)) for the end points 1 to 3. In dealing with high-speed connection and full-speed connection, the USB controller 212 detects the connection speed mode (high speed/full speed) between the host and the device at the time of USB connection, and provides the CPU 208 with the information regarding the connection speed. Assume that, when the DVC 102 is turned on, the compressed program in the program memory 214 is decompressed and developed in a program area of the memory 209, and the CPU 208 executes an operation in accordance with the program stored in the program area.

First, an operation at the time of high-speed connection is described.

Figure 4:
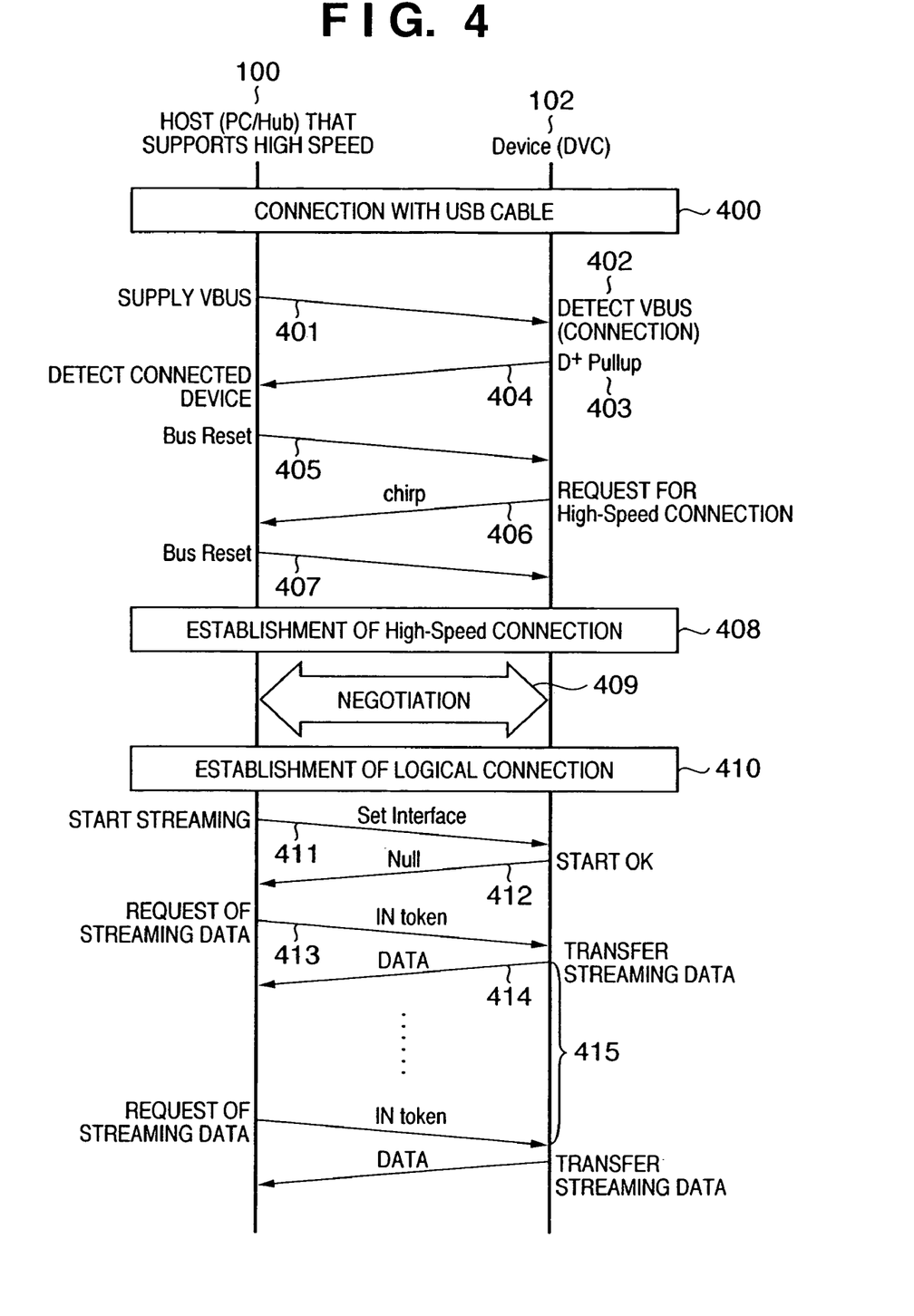
FIG. 4 is a chart showing a flow of data transfer operation between the digital video camera and a PC which supports high-speed connection.

FIG. 4 depicts a chart showing a flow of data transfer processing between the DVC 102 according to the present embodiment and the PC 100 which supports high-speed connection.

When the USB cable 101 is connected to the connector 213 of the DVC 102 to establish connection between the PC 100 and the DVC 102 (400), the PC 100 starts supplying VBUS to the DVC 102 through the USB cable 101 (401). The DVC 102, which has received the VBUS, detects the connection with the PC 100 (402), and pulls up a D+ signal of the USB cable 101 (403). The PC 100, which has detected (404) the connection of the DVC 102 upon the D+ signal pull-up, outputs a bus reset signal, and pulls down the D+ signal and D− signal of the USB cable 101 for a predetermined period (405).

The DVC 102, which has detected the bus reset, issues a chirp signal (406) calling for the high-speed connection using the D+ signal and D− signal of the USB cable 101 after a predetermined period elapses from the bus-reset output. The PC 100 cancels (OFF) the bus reset (407) after a predetermined period elapses from the bus-reset output. However, in a case where the PC 100 receives the chirp signal during the period of the bus-reset output, the high-speed connection is decided for the connection between the PC 100 and the DVC 102, and thereafter communication between the PC 100 and the DVC 102 is performed with the high-speed connection (high speed mode)(408).

After the speed mode is decided to the high-speed mode, a predetermined negotiation (409) is performed between the PC 100 and the DVC 102 via the control pipe (end point 0) to establish the logical connection (410) between the PC 100 and the DVC 102. Since details of the negotiation are described in "Universal Serial Bus Specification Revision 2.0, Apr. 27, 2000", a description thereof is omitted herein.

After the logical connection is established, the PC 100 starts streaming playback in response to a request from an application program or the like (not shown). In this case, the PC 100 issues from the control pipe (end point 0) to the DVC 102 a Set Interface command as a sign to start streaming playback (411). The DVC 102, which has received the Set Interface command, transmits a Null packet (412) via the control pipe (end point 0). The PC 100, which has received the Null packet, issues an IN token (413) via the isochronous pipe (end point 2) to the DVC 102 as a data transfer request for streaming playback. The DVC 102 outputs streaming data in a DV format via the isochronous pipe (end point 2) to the PC 100 (414). Thereafter by repeatedly performing IN token issuance and data transmission, the streaming playback in the DV format can be realized.

Described next is an encoding operation of image and audio data of the DVC 102 during data transfer for streaming playback.

An object image obtained through the lens 200 is photoelectrically converted by the image sensing device 201, and the converted electric signal is inputted to the camera signal processor 202. The electric signal is converted to a standard image signal by the camera signal processor 202 and temporarily stored in an image area of the memory 209. Meanwhile, an audio signal obtained from the microphone 206 is converted to a standard audio signal by the audio signal processor 207 and temporarily stored in an area different from the image area of the memory 209. The image audio encoder 205 compresses the standard image and audio signals which have temporarily been stored in the memory 209 into DV-format data, and temporarily stores the compressed data in another area of the memory 209.

In a case where the USB cable 101 is not connected to the USB connector 213, or a case where the USB cable 101 is connected to the USB connector 213 but the aforementioned streaming playback is not yet started, the display controller 204 displays on the display 203 the blue background image data that has been stored in advance in the memory 209. By this, a blue background image (blue screen) is displayed on the display 203.

In a case where streaming playback is already started, the PC 100 issues a Set Interface command to the USB device 102, and thereafter issues an IN token. The CPU 208 of the DVC 102, which has received the IN token from the USB controller 212, outputs DV-format data from the memory 209 to the USB controller 212. In this stage, header information is added to the data on the memory 209 and the data is outputted in accordance with a packet transmission rule of the video class. Since details regarding the addition of header information and packet transmission are specified in "Universal Serial Bus Device Class Definition for Video Devices Revision 1.0, Sep. 4, 2003", a description thereof is omitted herein.

As mentioned above, the display controller 204 displays on the display 203 the blue background image based on the image data stored in advance in the memory 209, before data output to the PC 100 is started. When the Null packet is transmitted in response to the Set Interface command from the PC 100 and data output to the PC 100 is started (414), the display controller 204 transfers the same image data as the data being outputted from the memory 209 to the PC 100 in accordance with the designation of the CPU 208, and displays an image on the display 203 according to the image data.

Thereafter, by repeating the above processes, the image data inputted from the CCD 201 and the audio data inputted from the microphone 206 are streamed to the PC 100, and at the same time, the image data being transferred is displayed on the display 203.

Figure 5:
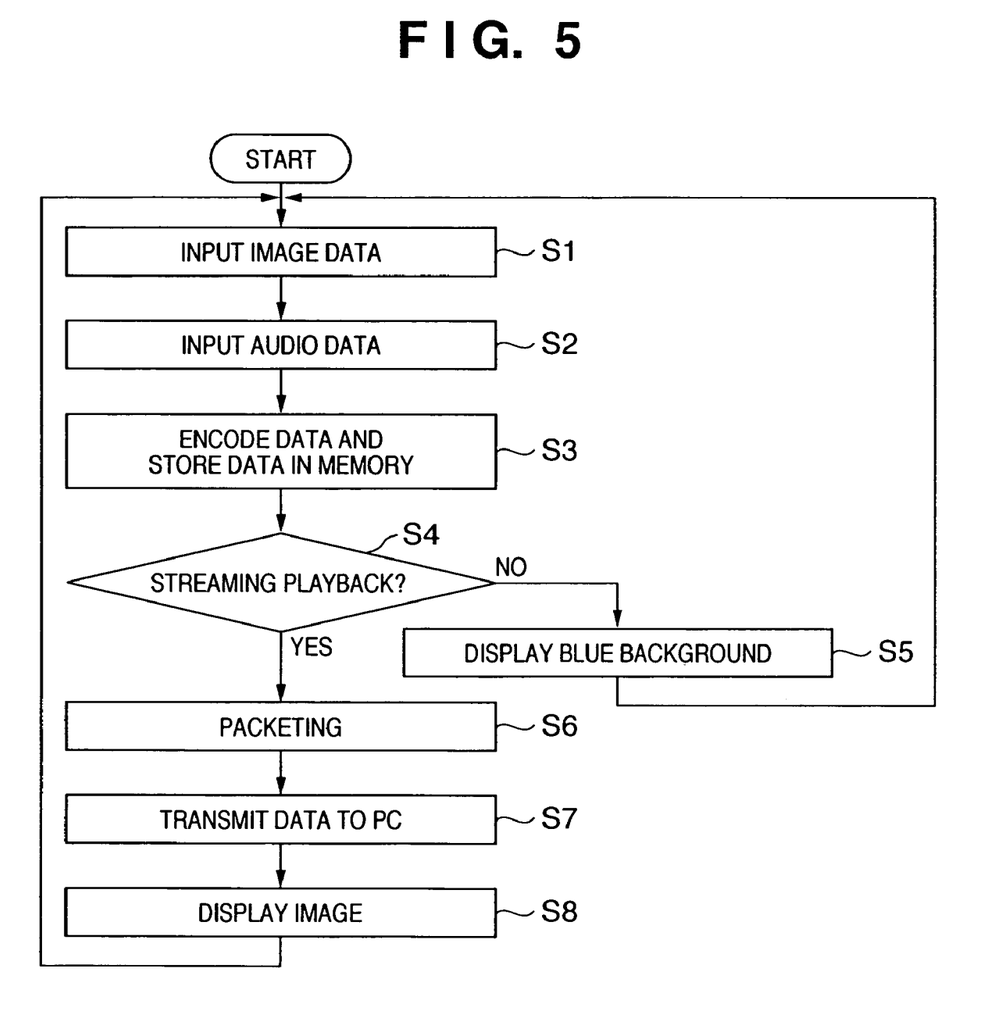
FIG. 5 is a flowchart describing a procedure in the digital video camera at the time of high-speed connection according to the first embodiment of the present invention.

FIG. 5 is a flowchart describing a procedure of the DVC 102 in the high-speed connection according to the first embodiment of the present invention. A program executing the procedure is stored in a program area of the memory 209 upon execution, and is executed under the control of the CPU 208.

In step S1, an image signal from the CCD 201 is inputted and stored in an image area of the memory 209. In step S2, an audio signal from the microphone 206 is inputted and stored in an audio area of the memory 209. In step S3, the image signal and audio signal are compressed by the image audio encoder 205, and the compressed data are respectively stored in corresponding areas of the memory 209. In step S4, it is determined whether or not streaming playback has been started. If NO, the control proceeds to step S5, where the aforementioned blue background image is displayed on the display 203, and the control returns to step S1.

In step S4, if it is determined that streaming playback has been started, the control proceeds to step S6, where DV-format data stored in the memory 209 is packed in a packet transmission format. In step S7, the packet data is outputted to the PC 100. In step S8, the same image data as the data being outputted from the memory 209 to the PC 100 is displayed on the display 203, and the control returns to step S1.

An operation at the time of full-speed connection is described as follows.

Figure 6:
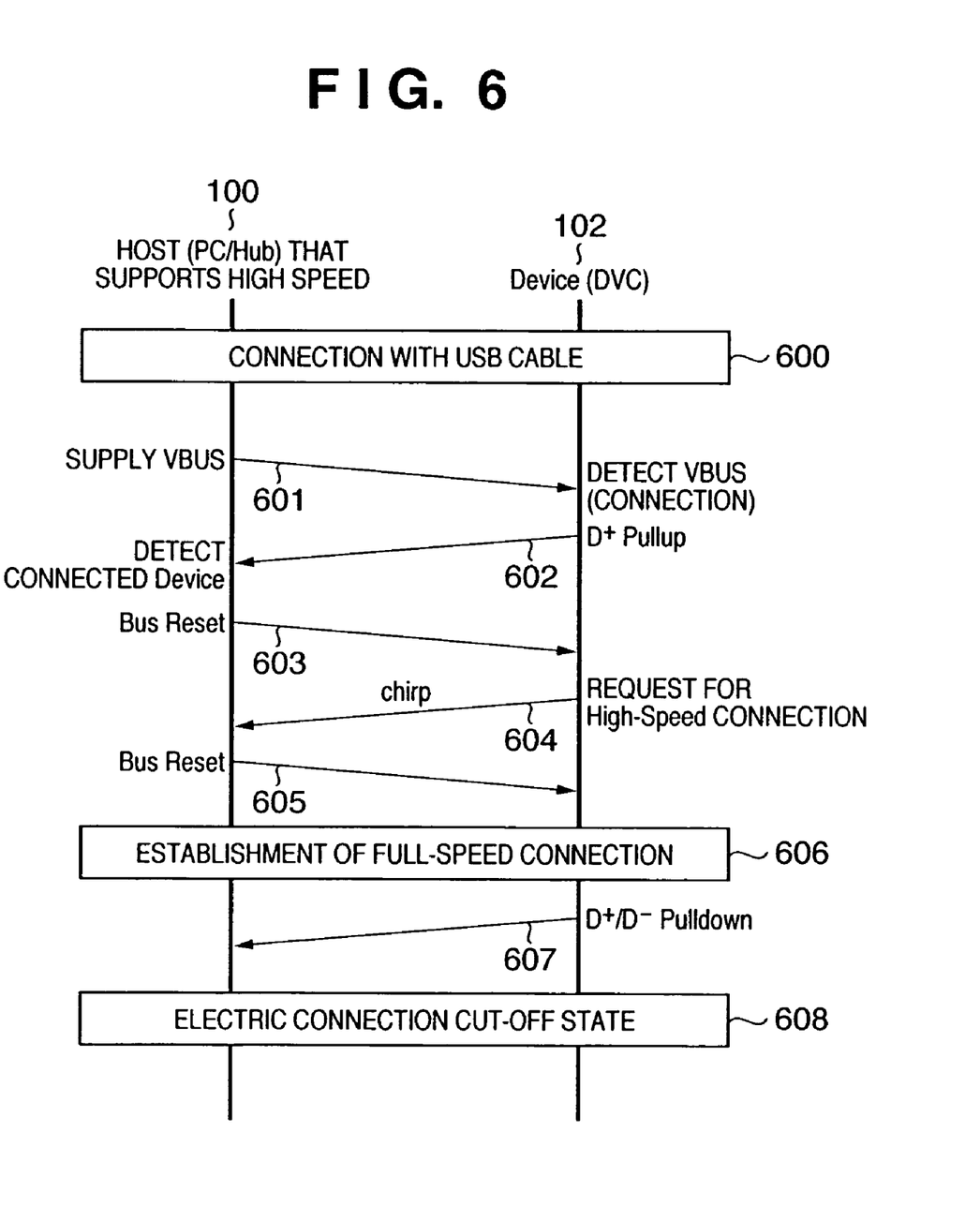
FIG. 6 is a chart showing a flow of data transfer operation between the digital video camera and a PC which does not support high-speed connection.

FIG. 6 is a chart showing a flow of data transfer processing between the DVC 102 according to the first embodiment of the present invention and the PC 100 which does not support the high-speed connection.

When the USB cable 101 is connected to the connector 213 to establish connection between the PC 100 and the DVC 102 (600), the PC 100 starts supplying VBUS to the DVC 102 through the USB cable 101 (601). The DVC 102, which has received the VBUS, detects the connection with the PC 100, and pulls up a D+ signal of the USB cable 101 (602). The PC 100, which has detected the connection of the DVC 102 upon the D+signal pull-up, outputs a bus reset signal (603), and pulls down the D+ signal and D− signal of the USB cable 101 for a predetermined period. The DVC 102, which has detected the bus reset, issues a chirp signal (604) calling for the high-speed connection using the D+ signal and D− signal of the USB cable 101 after a predetermined period elapses from the bus-reset output.

In this case, since the PC 100 does not support the high-speed connection, the PC 100 is unable to make determination even if the chirp signal is transmitted during the period of the bus-reset output, and cannot cancel the bus reset before a predetermined period elapses from the chirp signal reception (605). Accordingly, the DVC 102 decides the full-speed connection for the connection between the PC 100 and the DVC 102 (606). After the connection mode is decided to the full-speed connection, the CPU 208 of the DVC 102 drives the USB controller 212 to pull down the D+ signal and D− signal of the USB cable 101 (607), thereby electrically cutting off the connection between the PC 100 and the DVC 102.

In this stage, the CPU 208 of the DVC 102 writes message data in an area of the memory 209, from which the display controller 204 acquires image data for displaying, to indicate that the PC 100 does not support the streaming playback function and that the full-speed connection is established. The display controller 204 displays data superimposing the message on the blue background image on the display 203. In the foregoing manner, the streaming playback operation is not performed at the time of the full-speed connection.

As described above, according to the digital video camera of the first embodiment, in a case where the high-speed connection cannot be established between the camera and an external apparatus (PC) through a USB because the external apparatus does not support the high-speed connection, the electric connection between the camera and the external apparatus is forcefully cut off, thereby automatically refusing the start of the function that can be realized only in the high-speed connection. Furthermore, the camera can explicitly demonstrate to the user that the connection has been rejected since the external apparatus does not support the high-speed connection.

Second Embodiment

The above described first embodiment has described a case of cutting off electric connection between a host (PC) and a device (digital video camera) in a case where the high-speed connection cannot be established. The second embodiment describes a case of terminating data transfer by transmitting a Stall packet in response to a Set Interface command from the PC 100 which indicates the start of streaming. Note that the system construction of the second embodiment is identical to that of the first embodiment, and that the connection between the PC 100 (host) and the DVC 102 (device), the construction thereof, and the USB class employed in the DVC are the same as those of the first embodiment. Therefore, the description thereof is omitted.

Since the operation in the high-speed connection is identical to that of the first embodiment, the description thereof is not provided herein.

Figure 7:
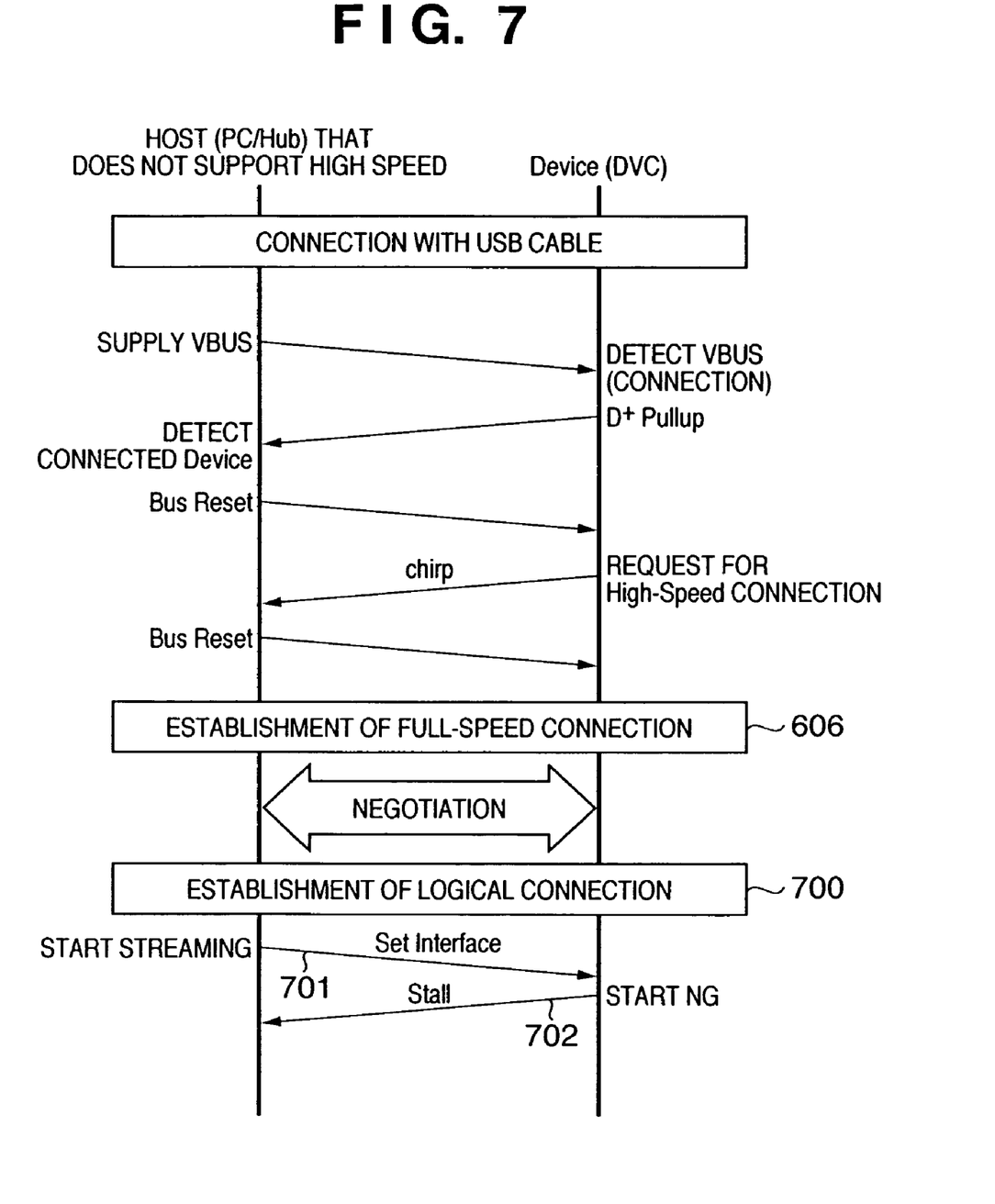
FIG. 7 is a chart showing a flow of an operation procedure at the time of full-speed connection according to the second embodiment of the present invention.

FIG. 7 is a chart showing a flow of an operation procedure at the time of the full-speed connection according to the second embodiment of the present invention. Since the procedure up to the establishment of the full-speed connection (606) is identical to that of FIG. 6, the description thereof is omitted. In FIG. 7, after the full-speed connection is established (606), a negotiation is performed to establish the logical connection (700).

After the logical connection is established (700) by the negotiation between the PC 100 and the DVC 102, the PC 100 starts streaming playback in response to a request from an application program (not shown). In this case, the PC 100 issues via the control pipe (end point 0) to the DVC 102 a Set Interface command as a sign to start streaming (701). The DVC 102, which has received the Set Interface command, transmits a Stall packet via the control pipe (end point 0) to the PC 100 (702), since the high-speed connection is not established. Thereafter, data transfer for data streaming is prohibited. The PC 100, which has received the Stall packet, no longer issues an image data transfer request to the DVC 102.

Note that since the displaying operation on the display 203 according to the second embodiment is the same as that of the first embodiment, the description thereof is omitted. However, the message is displayed after the DVC 102 returns a Stall packet (702).

As described above, according to the digital video camera of the second embodiment, in a case where the high-speed connection cannot be established between the camera and an external apparatus through a USB because the external apparatus does not support the high-speed connection, the electric connection between the camera and the external apparatus is forcefully cut off, thereby automatically refusing the start of the function that can be realized only in the high-speed connection. Furthermore, the camera can explicitly demonstrate to the user that the connection has been rejected.

Third Embodiment

The above-described second embodiment has described a case of terminating data transfer by returning a Stall packet. The third embodiment describes a case of terminating data transfer by returning a Null packet (empty packet). Note that the system construction of the third embodiment is identical to that of the first embodiment, and that the connection between the PC 100 (host) and the DVC 102 (device), the construction thereof, and the USB class employed in the DVC are the same as those of the first embodiment.

Since the operation at the time of the high-speed connection is identical to that of the first embodiment, the description thereof is not provided herein.

Figure 8:
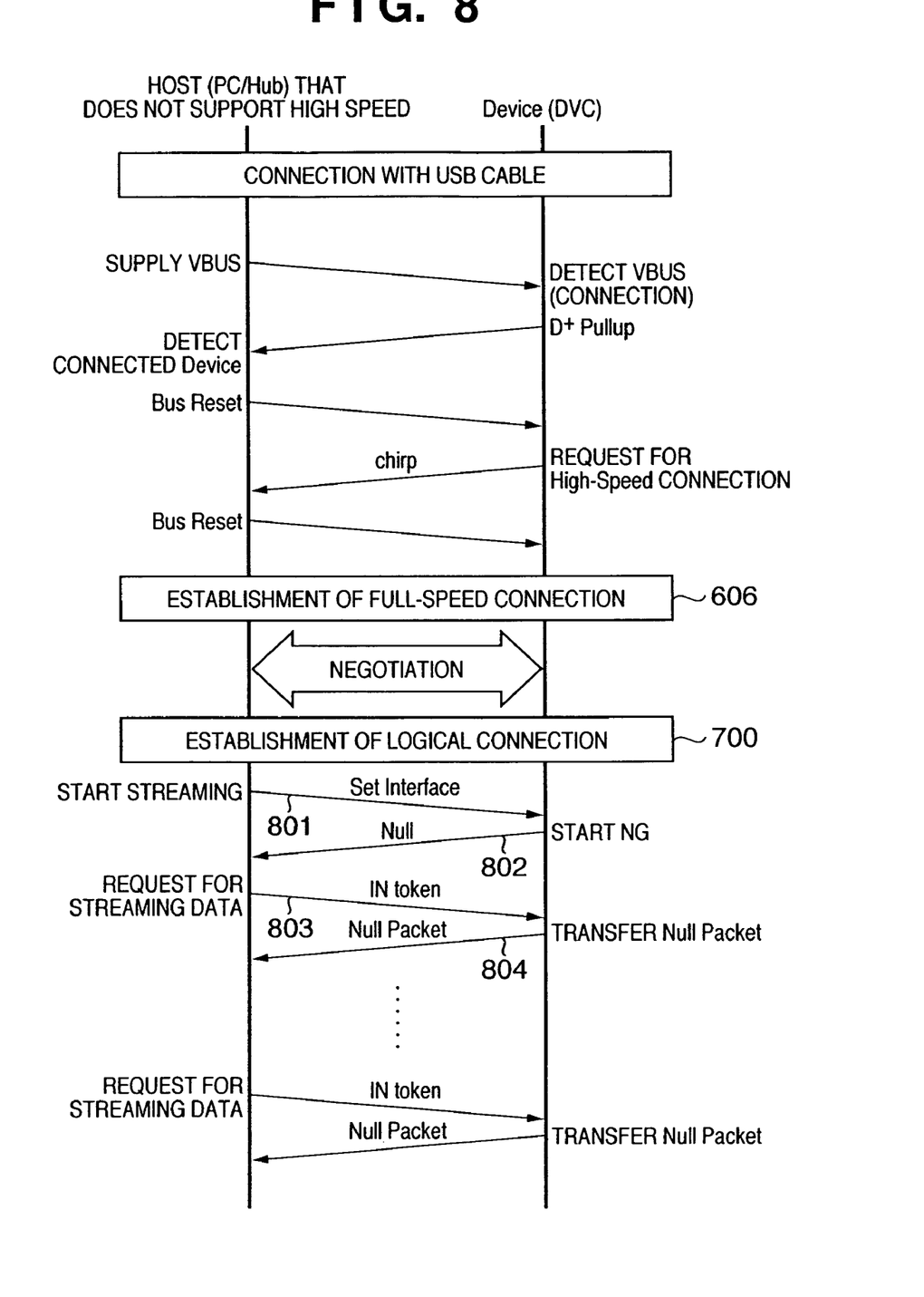
FIG. 8 is a chart showing a flow of an operation procedure at the time of full-speed connection according to the third embodiment of the present invention.

FIG. 8 is a chart showing a flow of an operation procedure at the time of the full-speed connection according to the third embodiment of the present invention. Since the procedure up to the establishment of logical connection (700 in FIG. 8) is identical to that of the second embodiment (FIG. 7), the description thereof is omitted herein.

After the logical connection is established (700), the PC 100 starts streaming playback in response to a request from an application program or the like (not shown). In this case, the PC 100 issues via the control pipe (end point 0) to the DVC 102 a Set Interface command as a sign to start of streaming playback (801). The DVC 102, which has received the Set Interface command, returns a Null packet (802). Next, the PC 100 issues an IN token (803) via the isochronous pipe (end point 2) to the DVC 102 as a data transfer request for streaming playback. In response, the DVC 102 outputs a Null packet (a packet including no real data) via the isochronous pipe (end point 2) as a sign for being unable to prepare data for streaming playback (804). Thereafter, the IN token issuance and Null packet return are repeated.

Since the displaying operation on the display 203 is the same as that of the first and second embodiments, the description thereof is omitted. However, the message is displayed on the display 203 after the DVC 102 returns the first Null packet (804).

Note that although the foregoing first to third embodiments have described a case where a USB connection is realized in accordance with the video class, the present invention is not limited to the video class.

Furthermore, according to the first to third embodiments, although the type of end point for data transfer is isochronous transfer, the present invention is not limited to isochronous transfer.

Still further, according to the first to third embodiments, although image and audio data are transferred in accordance with the video class, image data transfer may be performed in a class other than the video class, or only audio data transfer may be performed.

Still further, according to the first to third embodiments, although the image encoding format used in the video class is a DV format, the present invention is not limited to this.

Still further, according to the first to third embodiments, although the data transferred for streaming playback is inputted from a CCD or a microphone, the present invention is not limited to this, but is applicable to a case where data is read out of a storage medium, e.g., a memory card, and transferred. Moreover, according to the first to third embodiments, although an image displayed on the display unit during non-streaming is a blue background image, an image other than the blue background image may be displayed as long as the image helps a user recognize that the data transfer in the high-speed mode cannot be executed.

Fourth Embodiment

The above-described third embodiment has described a case of terminating data transfer by returning a Null packet. The fourth embodiment describes a case of terminating data transfer by returning a negative acknowledgement (NAK). Note that the system construction of the fourth embodiment is identical to that of the foregoing embodiments, and that the connection between the PC 100 (host) and the DVC 102 (device) and the construction thereof are the same as those of the foregoing embodiments. Therefore, the description thereof is omitted.

Figure 9:
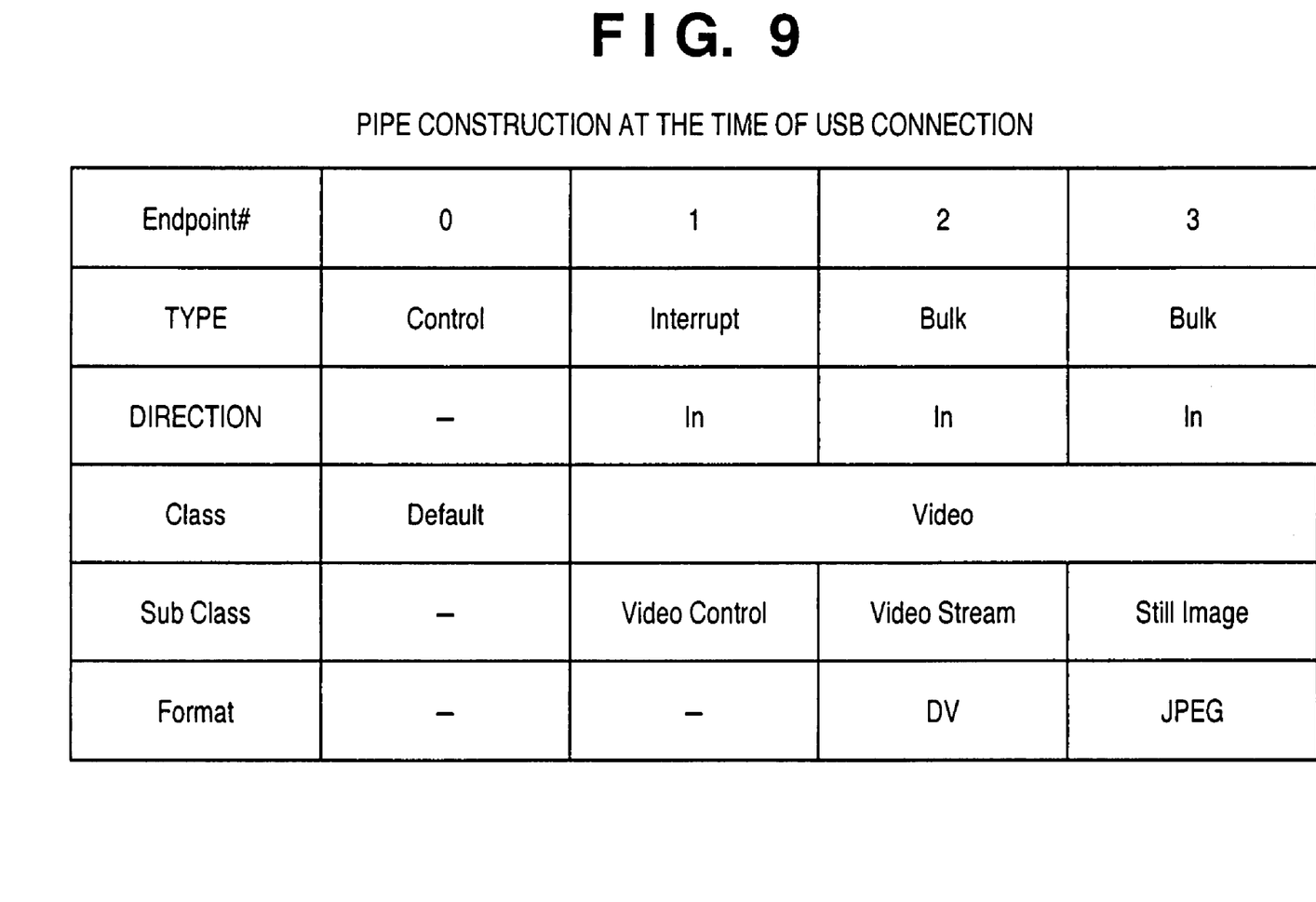
FIG. 9 depicts an explanatory view showing a class employed in the digital video camera according to the fourth embodiment of the present invention.

Note that the USB class employed in the fourth embodiment is shown in FIG. 9.

FIG. 9 depicts an explanatory view showing a class employed in the DVC 102 according to the fourth embodiment of the present invention.

As is apparent from comparison between FIG. 3 and FIG. 9, the USB controller 212 according to the fourth embodiment has a function for changing four end points 0 to 3 for communication (communication pipes), and the type of transfer (bulk transfer) for the end point 2. In dealing with the high-speed connection and full-speed connection, the USB controller 212 detects the connection speed mode (high speed/full speed) between the host and the device at the time of USB connection, and provides the CPU 208 with the information regarding the connection speed.

Next, an operation at the time of the high-speed connection is described with reference to FIG. 10.

Figure 10:
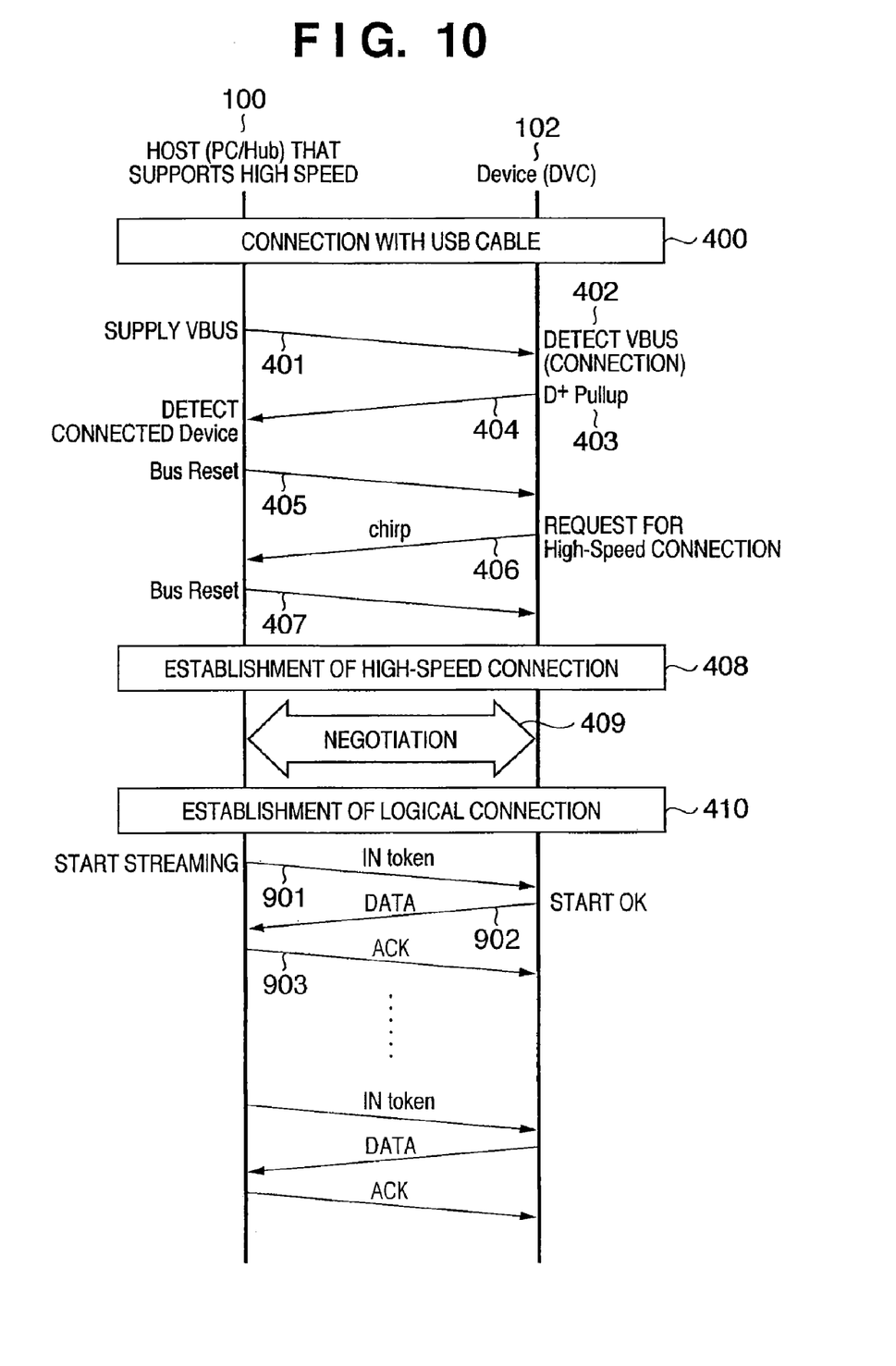
FIG. 10 is a chart showing a flow of data transfer operation between a device (digital video camera) and a host (PC) that supports high-speed connection.

FIG. 10 is a chart showing a flow of data transfer processing between the device (digital video camera) 102 according to the fourth embodiment and the host (PC) 100 that supports the high-speed connection. In the description referring to FIG. 10, since the procedure up to the establishment of logical connection (410) is identical to that of FIG. 4, the description thereof is omitted.

After the logical connection is established (410), the PC 100 starts streaming playback in response to a request from an application program or the like (not shown). In this case, the PC 100 issues via the streaming bulk pipe (end point 2) to the DVC 102 an In Token as a sign to indicate data reception for streaming (901). In response, the DVC 102 outputs streaming data in a DV format via the bulk pipe (end point 2) to the PC 100 (902). The PC 100, which has properly received the data, returns an acknowledgement (ACK) to the DVC 102 to notify proper reception. Thereafter by repeatedly performing IN token issuance, data transmission, and ACK return, data streaming playback in a DV format can be realized.

In this case, since the displaying operation on the display 203 is the same as that of the foregoing embodiments, the description thereof is omitted.

Described next is an operation at the time of the full-speed connection. Since the procedure up to the establishment of logical connection (700) is identical to that of FIGS. 7 and 8, the description thereof is omitted herein.

Figure 11:
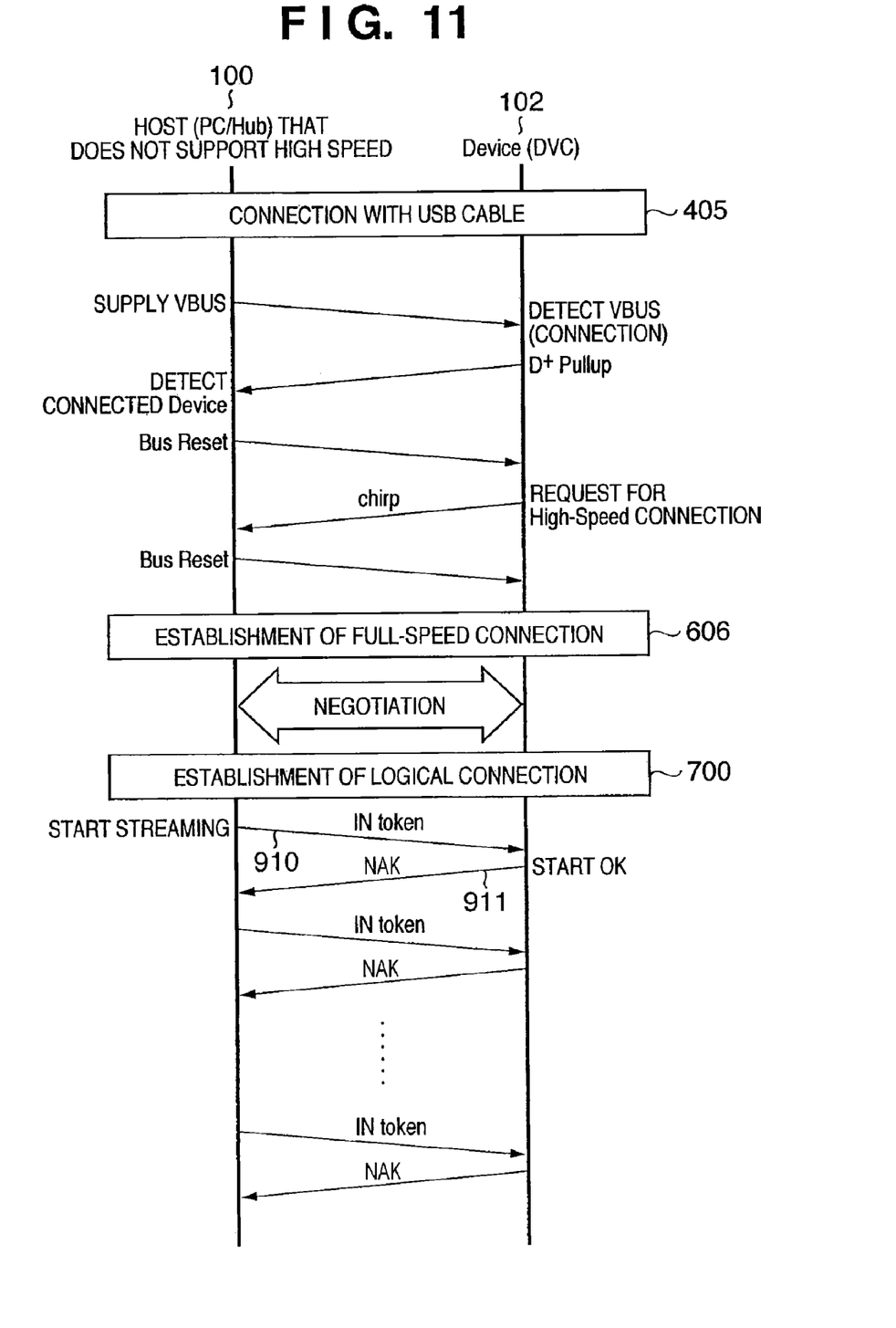
FIG. 11 is a chart showing a flow of an operation procedure at the time of full-speed connection according to the fourth embodiment of the present invention.

FIG. 11 is a chart showing a flow of an operation procedure at the time of the full-speed connection according to the fourth embodiment of the present invention. Since the procedures up to the establishment of the full-speed connection (606) and the establishment of logical connection (700) by performing a negotiation are identical to the above-described embodiments, the description thereof is omitted.

After the logical connection is established (700) by the negotiation between the PC 100 and the DVC 102, the PC 100 starts streaming playback in response to a request from an application program or the like (not shown). In this case, the PC 100 issues via the streaming bulk pipe (end point 2) to the DVC 102 an TN Token as a sign to start streaming (910). The DVC 102, which has received the IN Token, returns NAK via the bulk pipe (end point 2) as a sign for being unable to prepare data for streaming playback (911). Thereafter, the IN token issuance and NAK return are repeated.

Since the displaying operation on the display 203 according to the fourth embodiment is the same as that of the foregoing embodiments, the description thereof is omitted. However, the message is displayed on the display 203, for instance, after the DVC 102 returns the first NAK.

Note that although the fourth embodiment has described a case where a USB connection is realized in accordance with the video class, the present invention is not limited to the video class.

Further, according to the fourth embodiment, although image and audio data are transferred in accordance with the video class, image data transfer may be performed in a class other than the video class, or only audio data transfer may be performed.

Furthermore, according to the fourth embodiment, although the image encoding format used in the video class is a DV format, the present invention is not limited to this.

Still further, according to the fourth embodiment, although the data transferred for streaming playback is image data and audio data inputted from a CCD or a microphone, the present invention is not limited to this.

Still further, according to the fourth embodiment, although an image displayed on the display unit during non-streaming is a blue background image, an image other than the blue background image may be displayed as long as the image helps a user recognize that the data transfer in the high-speed mode cannot be executed.

Still further, according to the fourth embodiment, although the PC 100 is informed by NAK return that data transfer in the high-speed mode cannot be executed, the present invention is not limited to this configuration. This configuration may be changed to, e.g., a configuration for cutting off an electric connection between the PC 100 and the DVC 102.

Still further, according to the fourth embodiment, although the PC 100 is informed by the NAK return that data transfer in the high-speed mode cannot be executed, the present invention is not limited to this configuration. This configuration may be changed to, e.g., a configuration for informing the PC 100 by a Null packet return.

Still further, according to the fourth embodiment, although the PC 100 is informed by the NAK return that data transfer in the high-speed mode cannot be executed, the present invention is not limited to this configuration. This configuration may be changed to, e.g., a configuration for informing the PC 100 by a Stall return. In this case, the PC 100 needs to have a configuration for transmitting a Set Interface command.

As has been set forth above, according to the first to fourth embodiments, by virtue of displaying image data being transferred for streaming playback on a display unit, a user is able to determine whether or not the data is being transferred for streaming playback.

Furthermore, according to the first to fourth embodiments, in a case where streaming playback cannot be executed by an external apparatus such as a PC despite the user's instruction to start streaming playback, the user can be informed of this fact.

Other Embodiment

As mentioned above, the object of the present invention can also be achieved by providing a storage medium storing program codes of a software for realizing the functions of the above embodiments to a computer system or apparatus, reading the program codes, by a computer (CPU or MPU) of the system or apparatus, from the storage medium, then executing the program. In this case, the program codes read from the storage medium realize the functions according to the embodiments, and the storage medium storing the program codes constitutes the invention. The storage medium, such as a floppy disk (registered trademark), a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs part or the entire processes in accordance with designations of the program codes and realizes functions of the above embodiments.

The present invention is not limited to the above embodiments and various changes and modifications can be made thereto within the spirit and scope of the present invention. Therefore, to apprise the public of the scope of the present invention, the following claims are made.

CLAIM OF PRIORITY

This application claims priority from Japanese Patent Application No. 2004-162463 filed on May 31, 2004, the entire contents of which are hereby incorporated by reference herein.

What is claimed is:

1. A video camera device comprising:
    an image data generating unit that generates image data corresponding to a captured image;
    a communication control unit that
        (a) determines whether a speed mode between the video camera device and an external device is a first speed mode or a second speed mode,
        (b) communicates with the external device at a first speed if the speed mode is the first speed mode, and
        (c) communicates with the external device at a second speed slower than the first speed if the speed mode is the second speed mode;
    a device control unit that
        (a) enables transfer of the image data if the communication control unit determines that the speed mode is the first speed mode, and
        (b) disables the transfer of the image data if the communication control unit determines that the speed mode is the second speed mode; and
    a display unit that
        (a) displays the image data being transferred to the external device if the communication control unit determines that the speed mode is the first speed mode and the device control unit enables the transfer of the image data, and
        (b) does not display the image data if the communication control unit determines that the speed mode is the second speed mode and the device control unit disables the transfer of the image data.

2. The video camera device according to claim 1, wherein the video camera device is configured to electrically disconnect a connection between the video camera device and the external device if the communication control unit determines that the speed mode is the second speed mode.

3. The video camera device according to claim 1, wherein the communication control unit is conformed to USB (Universal Serial Bus).

4. The video camera device according to claim 3, wherein the first speed mode is a high-speed mode and a second speed mode is a full-speed mode.

5. The video camera device according to claim 3, wherein the communication control unit transmits NAK to the external device in response to IN token.

6. The video camera device according to claim 3, wherein the communication control unit transmits Stall to the external device in response to a Set Interface command.

7. A method for controlling a video camera device comprising:
    a step of generating image data corresponding to a captured image;

a determining step of determining whether a speed mode between the video camera device and an external device is a first speed mode or a second speed mode;

a first communicating step of communicating with the external device at a first speed if the determining step determines that the speed mode is the first speed mode;

a second communicating step of communicating with the external device at a second speed slower than the first speed if the determining step determines that the speed mode is the second speed mode;

a step of enabling transfer of the image data if the determining step determines that the speed mode is the first speed mode;

a step of disabling the transfer of the image data if the determining step determines that the speed mode is the second speed mode;

a step of displaying the image data being transferred to the external device on a display unit of the video camera device if the determining step determines that the speed mode is the first speed mode and the enabling step enables the transfer of the image data; and a step of controlling the video camera device not to display the image data on the display unit if the determining step determines that the speed mode is the second speed mode and the disabling step disables the transfer of the image data.

8. The method according to claim 7, further comprising:
a step of electrically disconnecting a connection between the video camera device and the external device if the determining step determines that the speed mode is the second speed mode.

9. The method according to claim 7, wherein the video camera device communicates with the external device using USB (Universal Serial Bus).

10. The method according to claim 9, wherein the first speed mode is a high-speed mode and the second speed mode is a full-speed mode.

11. The method according to claim 9, further comprising:
a step of transmitting NAK to the external device in response to IN token.

12. The method according to claim 9, further comprising:
a step of transmitting Stall to the external device in response to a Set Interface command.

13. The video camera device according to claim 3, wherein the communication control unit transmits a null packet to the external device in response to a Set Interface command.

14. The method according to claim 9, further comprising:
a step of transmitting a null packet to the external device in response to a Set Interface command.

15. The video camera device according to claim 1, wherein the display unit displays predetermined image data instead of the image data if the communication control unit determines that the speed mode is the second speed mode.

16. The method according to claim 7, further comprising:
a step of displaying predetermined image data instead of the image data if the determining step determines that the speed mode is the second speed mode.

* * * * *